United States Patent [19]

Eng

[11] Patent Number: 5,311,551
[45] Date of Patent: May 10, 1994

[54] DIGITAL SIGNAL HARDWARE PROTECTION SWITCHING

[75] Inventor: Stephen K. Eng, Andover, Mass.

[73] Assignee: AT&T Bell Laboratories, Murray Hill, N.J.

[21] Appl. No.: 825,351

[22] Filed: Jan. 24, 1992

[51] Int. Cl.$^5$ .................. H04K 1/10; H04L 27/28
[52] U.S. Cl. ........................... 375/38; 375/40; 375/104; 455/132
[58] Field of Search ............ 375/38, 40, 104; 455/67.1, 67.3, 132; 340/825.01

[56] References Cited

U.S. PATENT DOCUMENTS

| | | | |
|---|---|---|---|
| 4,395,772 | 7/1983 | Trested, Jr. | 375/40 |
| 4,417,348 | 11/1983 | Abbruscato | 375/40 |
| 4,477,895 | 10/1984 | Casper et al. | 375/40 X |
| 4,635,249 | 6/1987 | Bortolini et al. | |
| 4,773,081 | 9/1988 | Morimoto | 375/40 |

FOREIGN PATENT DOCUMENTS

| | | |
|---|---|---|
| 0246663 | 5/1987 | European Pat. Off. |
| 62-299135 | 12/1987 | Japan |
| 2055437 | 2/1990 | Japan |
| 3026122 | 4/1991 | Japan |

OTHER PUBLICATIONS

Noda & Murakami, "Design of a hitless switching count for high capacity Digital Radio systems and its application," NYC '80 IEEE 1980 National Telecommunications Conference, Houston, Tex. U.S.A. (Nov. 30–Dec. 4, 1980).

IEEE International Conference On Communicatioons 1985, Chicago, Ill., "Frequency Diversity Protection In Digital Radio With Hitless Switching", G. Cellerino et al., Jun. 23–26, 1985, pp. 1513–1517.

Primary Examiner—Stephen Chin
Assistant Examiner—Bryan Webster
Attorney, Agent, or Firm—Thomas Stafford

[57] ABSTRACT

Protection switching of digital signal transmitting and receiving hardware is realized in a "hitless" manner. The hitless switch is obtained by employing hardware switching units which can individually determine the instant to switch from an active state to a standby state and vice versa. A switch is initialized by supplying a switch request signal from a control unit to a hardware switching unit in the active state. The active hardware switching unit, upon detecting a prescribed bit condition, for example, a predetermined bit state, of the digital signal being supplied as an output therefrom, supplies a predetermined synchronization pulse to the standby hardware switching unit. In response to the synchronization pulse, the standby hardware switching unit forces the bit condition of a bit of the digital signal to be supplied as an output therefrom resulting from a current input bit to be in the same bit condition as that detected in the active hardware unit. Output circuits in both the active hardware switching unit and standby hardware switching unit are simultaneously turned OFF and ON, respectively, in the individual units by observing the digital signal being supplied as an input to both units. Upon detection of a predetermined bit condition of the input digital signal individually by each of the hardware switching units, the active unit output circuit is turned OFF and the standby unit output circuit is turned ON at the same instant. The instant of turning OFF and On of the output circuits is determined individually in each hardware switching unit.

16 Claims, 7 Drawing Sheets

DIGITAL SIGNAL HARDWARE PROTECTION SWITCHING

TECHNICAL FIELD

This invention relates to transmission of digital signals and, more particularly, to hardware protection switching.

BACKGROUND OF THE INVENTION

It has been the practice to duplicate individual hardware units used in the switching or transmission of digital signals if failure of a single hardware unit could cause the failure of a predetermined number of digital signal channels. That is, there must be a backup hardware unit which can be switched to in the event of such a hardware unit failure. In known hardware protection switching arrangements, the switching of digital signals from one hardware unit to the other is achieved by employing relays. In such arrangements, signal loss is detected and the signal is redirected to a standby unit. A problem with the relay switching arrangement is that the customer communication traffic is interrupted for a significant interval. This interruption could cause calls to be dropped, which is undersirable. Even if the call is not dropped, the relay switching causes so-called glitches or hits in the digital signal transmitting the customer communications traffic which may cause an alarm condition. For example, the glitch could propagate as a bipolar violation or the like.

SUMMARY OF THE INVENTION

The problems of prior hardware protection switching arrangements are overcome, in accordance with the invention, by employing hardware units including switching units which can individually determine the instant to switch from an active state to a standby state and vice versa in order to achieve a so-called "hitless" switch of the hardware unit supplying a digital signal to and receiving a digital signal from a transmission line.

In one embodiment, the desired hitless switching of hardware units is realized by assuring that timing signals supplied to each of the hardware units, i.e., active and associated standby, are phase aligned and by initializing a switching unit in a first hardware unit into an active state and an associated switching unit in a second hardware unit into a standby state. To initiate a hardware protection switch, a protection switch request signal is supplied to the switching unit in the current active hardware unit. The active switching unit determines if a data bit to be supplied as an output resulting from a current input data bit has a prescribed bit condition. If the prescribed bit condition is detected, a first control signal, e.g., a prescribed synchronization pulse, is supplied from the current active switching unit to the associated standby switching unit. In response to the prescribed synchronization pulse, the bit condition of the digital signal to be supplied as an output from the standby switching unit, resulting from the current input bit, is caused to be aligned with the bit condition of the digital signal being supplied as an output from the current active switching unit. Then, output circuits in the current active switching unit and in the standby switching unit must be simultaneously turned OFF and ON, respectively. This is achieved by the switching units individually observing the common digital data signal being supplied as an input to them. Upon detection by each of the switching units of a prescribed bit condition of the common input digital signal, a second control signal is generated which causes the output circuit in the current active hardware switching unit to be turned OFF and the output circuit in the standby hardware switching unit to be turned ON at the same instant. Again, the instant that the output circuits are turned OFF and ON is determined individually in each hardware switching unit. Consequently, the prior standby hardware switching unit is now the active unit and the prior active hardware switching unit is now the standby unit.

A technical advantage of the invention is that no central switching control unit is needed to determine the instant when to switch from an active hardware unit to a standby hardware unit. Control apparatus is employed only to initiate the hardware unit switch.

DETAILED DESCRIPTION

Figure 5:
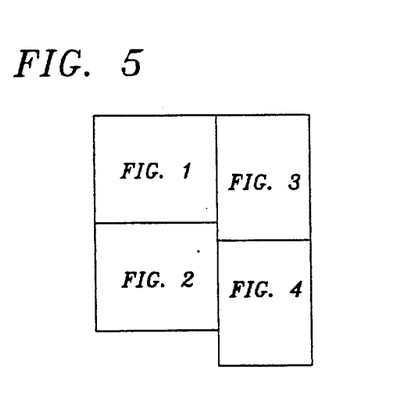

FIGS. 1 through 4 when connected as shown in FIG. 5 show, in simplified block diagram form, a system employing a hitless hardware protection switching arrangement, including an embodiment of the invention. Specifically, shown are data transmit, receive and control unit 101, interface units 104(1) and 104(0), hardware units 105(1) and 105(0) and line coupler unit 106. The designations "(1)" and "(0)" are used to denote apparatus associated with, for example, an active hardware unit (1) and its associated standby hardware unit (0). Data transmit, receive and control unit 101 is, for example, a digital switch, digital access and cross-connect system, intelligent multiplexer or the like and, illustratively, is a 5ESS ® digital switch commercially available from AT&T. Hereinafter, data transmit, receive and control unit 101 is referred to as digital switch 101. Although only two hardware units 105(1) and 105(0) are shown in this example, it will be apparent that any number of hardware unit pairs, i.e., active (1) and standby (0), may be employed as desired with a particular digital switch 101.

Digital switch 101 supplies and receives control information to and from interfaces 104(1) and 104(0) via control buses 102(1) and 102(0), respectively. The control information includes, but is not limited to the digital signal format to be used by hardware units 105(1) and 105(0), whether a hardware protection switch is to be initiated and whether a hardware protection switch has been completed. Digital switch 101 also supplies to and receives from interfaces 104(1) and 104(0) digital data signals via data buses 103(1) and 103(0), respectively. In this example, buses 103(1) and 103(0) are each the known peripheral interface data bus (PIDB) used in the 5ESS ® digital switch. The individual digital data signals being supplied to and from interfaces 104 via the PIDB buses 103 are, in this example, unipolar. The digital data signals being supplied on data buses 103 include N digital data signals, which are supplied in multiplexed fashion.

Interface units 104(1) and 104(0) are also employed to supply and receive control information, and the N digital data signals to and from hardware units 105(1) and 105(0), respectively. Additionally, interface units 104(1) and 104(0) also supply timing signals to hardware units 105(1) and 105(0), namely, TCLOCK (line clock), FSYNC (frame sync) and ESFSYNC (extended super frame sync). In this example, TCLOCK has a bit rate of 1.544 Mb/sec, FSYNC is supplied at 8 kHz and ESF-SYNC is supplied at 0.3333 kHz, these rates being associated with the well known DS1 ESF digital signal format. Such timing signals are generated in well known fashion. Processor 110(1) in hardware unit 105(1) receives and transmits control information over bus 120(1) from and to interface 104(1), respectively. Similarly, processor 110(0) in hardware unit 105(0) receives and transmits control information over bus 120(0) from and to interface 104(0), respectively.

In this example, not to be construed as limiting the scope of the invention, line coupler unit 106 includes a first plurality of transformers 116-1 through 116-N and a second plurality of transformers 117-1 through 117-N for interfacing to receive portions of a plurality of digital transmission lines comprised of $T_1$-1 and $R_1$-1 through $T_1$-N and $R_1$-N and to a plurality of transmit portions of the plurality digital transmission lines comprised of $T_2$-1 and $R_2$-1 through $T_2$-N and $R_2$-N, respectively. Thus, incoming digital signals are supplied from incoming digital transmission line portions $T_1$-1 and $R_1$-1 through $T_1$-N and $R_1$-N via transformers 116-1 through 116-N of line coupler 106 to digital signal interface switch (DSI-S) units 112(1)-1 through 112(1)-N and DSI-S units 112(0)-1 through 112(0)-N in hardware units 105(1) and 105(0), respectively. Outgoing digital signals are supplied from DSI-S units 112(1)-1 through 112(1)-N and DSI-S units 112(0)-1 through 112(0)-N via transformers 117-1 through 117-N of line coupler 106 to transmit portions $T_2$-1 and $R_2$-1 through $T_2$-N and $R_2$-N, respectively, of the associated N digital transmission lines. Obviously, outgoing digital signals are only supplied from the active DSI-S 112 units. It is also noted that such line coupler units are well known in the art and only a simplified version is shown.

Since hardware units 105(1) and 105(0) are identical, only hardware unit 105(1) will be described in detail. However, it is important to note that the digital data signal T'DATA and timing signals TCLOCK, FSYNC and ESFSYNC supplied to a PCM transceiver 111(1) in hardware unit 105(1) are identical to the digital data signal T'DATA and timing signals TCLOCK, FSYNC and ESFSYNC being supplied to the associated PCM transceiver 111(0) in hardware unit 105(0). Assurance that the timing signals TCLOCK, FSYNC and ESF-SYNC are phase aligned is readily obtained by employing a common reference clock signal in known fashion. The same digital data signal T'DATA is simply supplied to both associated PCM transceivers 111(1) and 111(0) in the protection switching pair of hardware units 105(1) and 105(0). These conditions are readily obtained in interface units 104(1) and 104(0). Although the timing signals TCLOCK, FSYNC and ESFSYNC, in this example, are shown as being the same, i.e., in phase alignment, for all of PCM transceivers 111(1) and 111(0), it is only necessary that the timing signals being supplied to each pair of PCM transceivers 111(1) and 111(0) be phase aligned.

Specifically, hardware unit 105(1) includes processor 110(1), a plurality of pulse code modulation (PCM) transceivers 111(1)-1 through 111(1)-N and the aforementioned plurality of digital signal interface-switch units (DSI-S) 112(1)-1 through 112(1)-N. Each of DSI-S units 112(1) receives incoming digital signals from a corresponding digital transmission line via line coupler 106 at inputs $T_1$ and $R_1$, and supplies outgoing digital signals at outputs $T_2$ and $R_2$. As indicated above, the well known DS1 ESF digital signal is assumed in this example.

Each of PCM transceivers 111(1)-1 through 111(1)-N receives an associated one of the T'DATA-1 through T'DATA-N signals, respectively, and TCLOCK, FSYNC and ESFSYNC from interface unit 104(1). PCM transceivers 111(1)-1 through 111(1)-N supply received digital data signals R'DATA(1)-1 through R'DATA(1)-N, respectively, to interface unit 104(1). In this example, T'DATA and R'DATA(1) are unipolar digital data signals including eight (8) bits per time slot. Each of PCM transceivers 111(1)-1 through 111(1)-N formats its associated T'DATA digital data signal under control of processor 110(1) into a formatted TDATA unipolar DS1 ESF digital signal. The formatted digital signals TDATA-1 through TDATA-N are supplied along with their associated TCLOCK-1 through TCLOCK-N timing signals to the corresponding DSI-S units 112(1)-1 through 112(1)-N, respectively. Additionally, each of PCM transceivers 111(1) deformats an incoming RDATA unipolar DS1 ESF digital signal supplied from the associated DSI-S unit 112(1) into a digital data signal R'DATA(1) which is supplied to interface unit 104(1). Processor 110(1) supplies control signals C(1)-1 through C(1)-N to PCM transceivers 111(1)-1 through 111(1)-N, respectively, which indicate the particular PCM digital signal format being employed. Such PCM transceiver arrangements are known and commercially available.

A number of signals are shown as being supplied to and from DSI-S units 112(1) from and to processor 110(1). In this example, these signals are the same for each of DSI-S units 112(1). However, in other applications, each of DSI-S units 112(1)-1 through 112(1)-N may have a different set of such control signals. Accordingly, the signals are defined as follows without the noted designations:

MS—Force to active state
SWRQ—Switch initiation signal
FSS—Force to standby state Active state indication signals AS(1)-1 through AS(1)-N are supplied from DSI-S units 112(1)-1 through 112(1)-N, respectively, to processor 110(1). Additionally, a first control signal, namely, sychronization pulse (SYNCN), is coupled between DSI-S units 112(1)-1 through 112(1)-N in hardware unit 105 (1) on a one-to-one basis to associated DSI-S units 112(0)-1 through 112(0)-N, respectively, in hardware unit 105(0). When either DSI-S unit 112(1) or its associated DSI-S unit 112(0) is in the active state, the corresponding SYNCN connection, i.e., pin, is used as an output. Conversely, when either DSI-S unit 112(1) or its associated DSI-S unit 112(0) is in the standby state, the corresponding SYNCN connection is used as an input.

Figure 1:
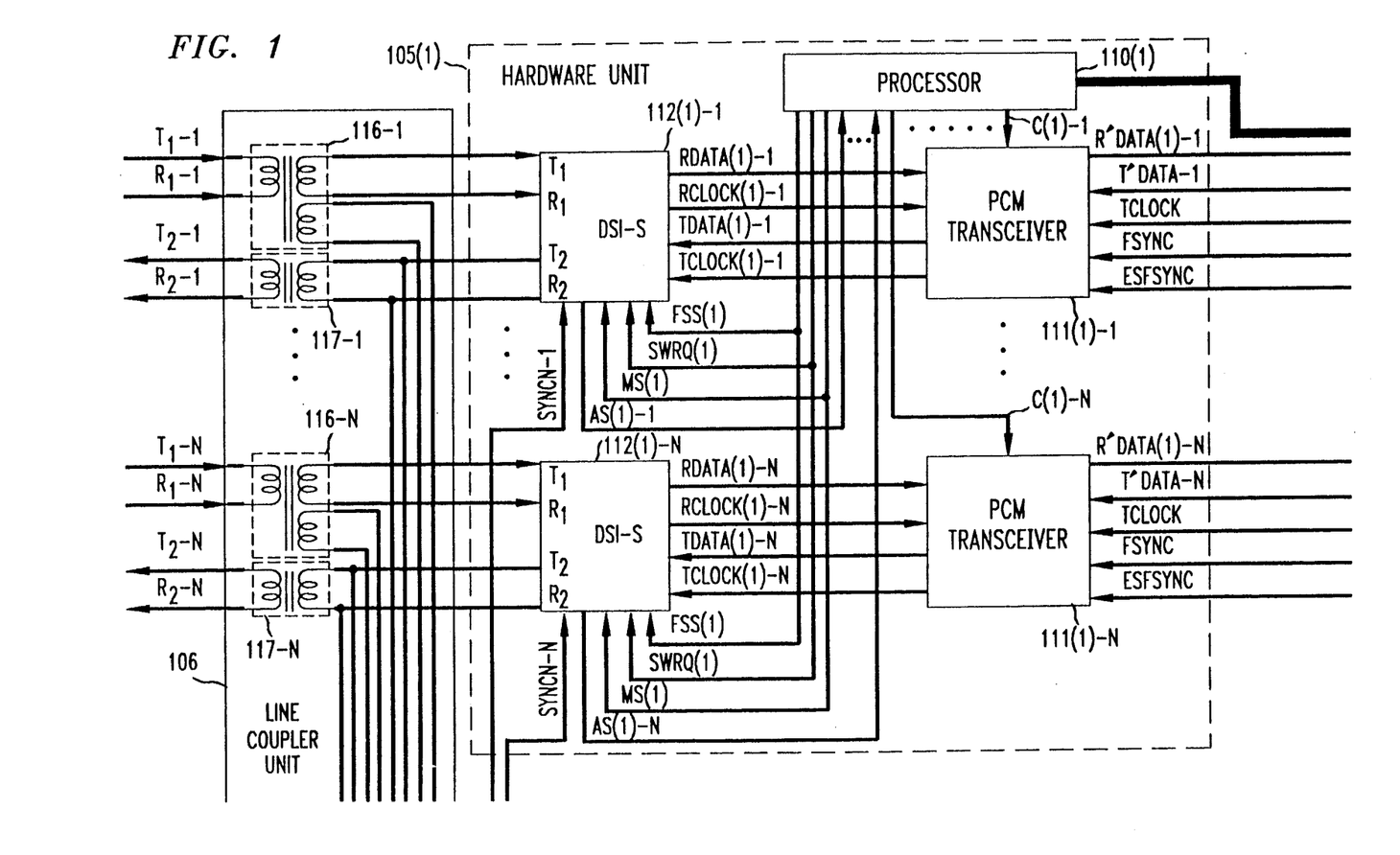
FIGS. 1 through 4 when connected as shown in FIG. 5 show, in simplified block diagram form, a system employing a hardware protection switching arrangement including an embodiment of the invention.
Figure 2:
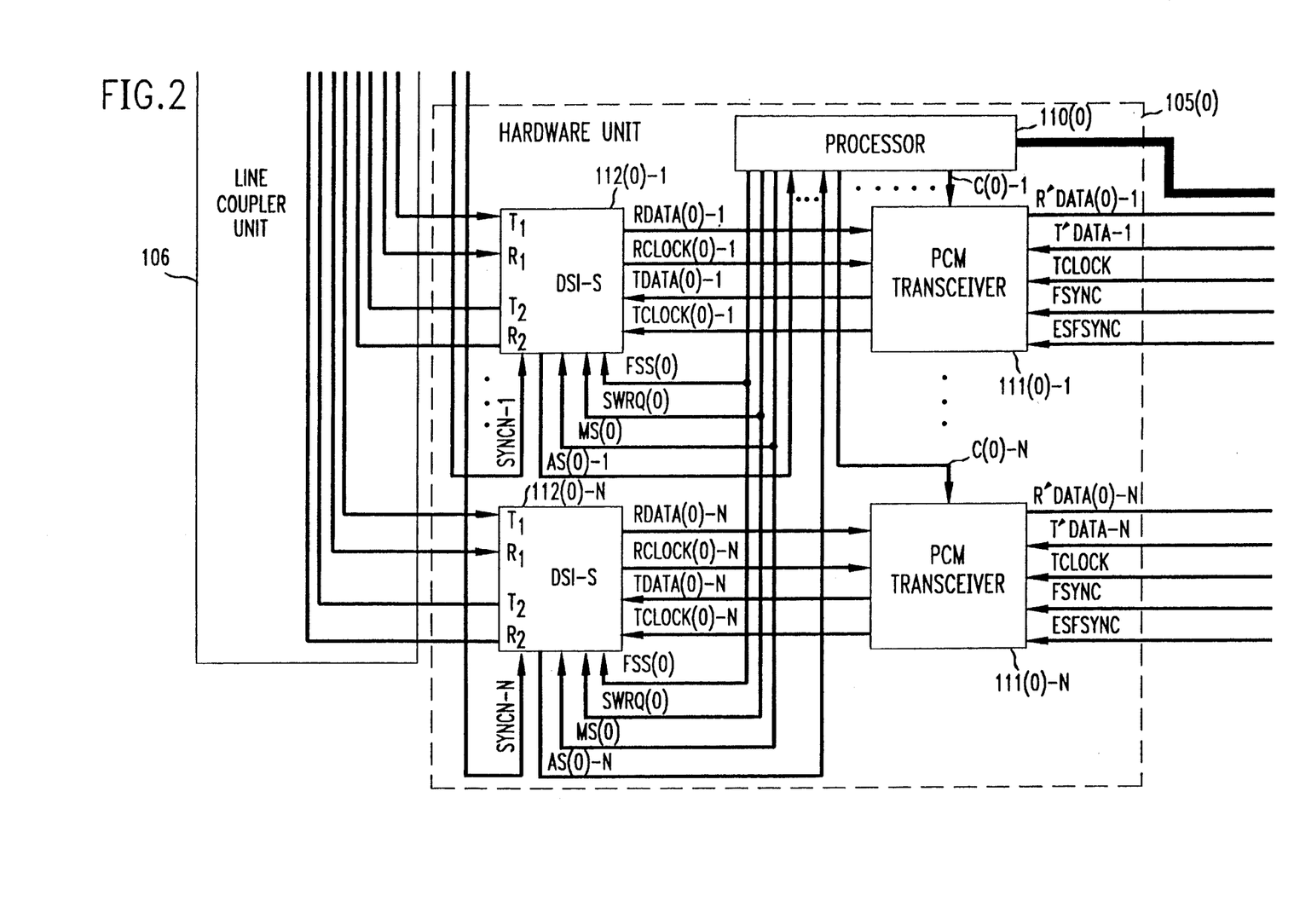
Figure 3:
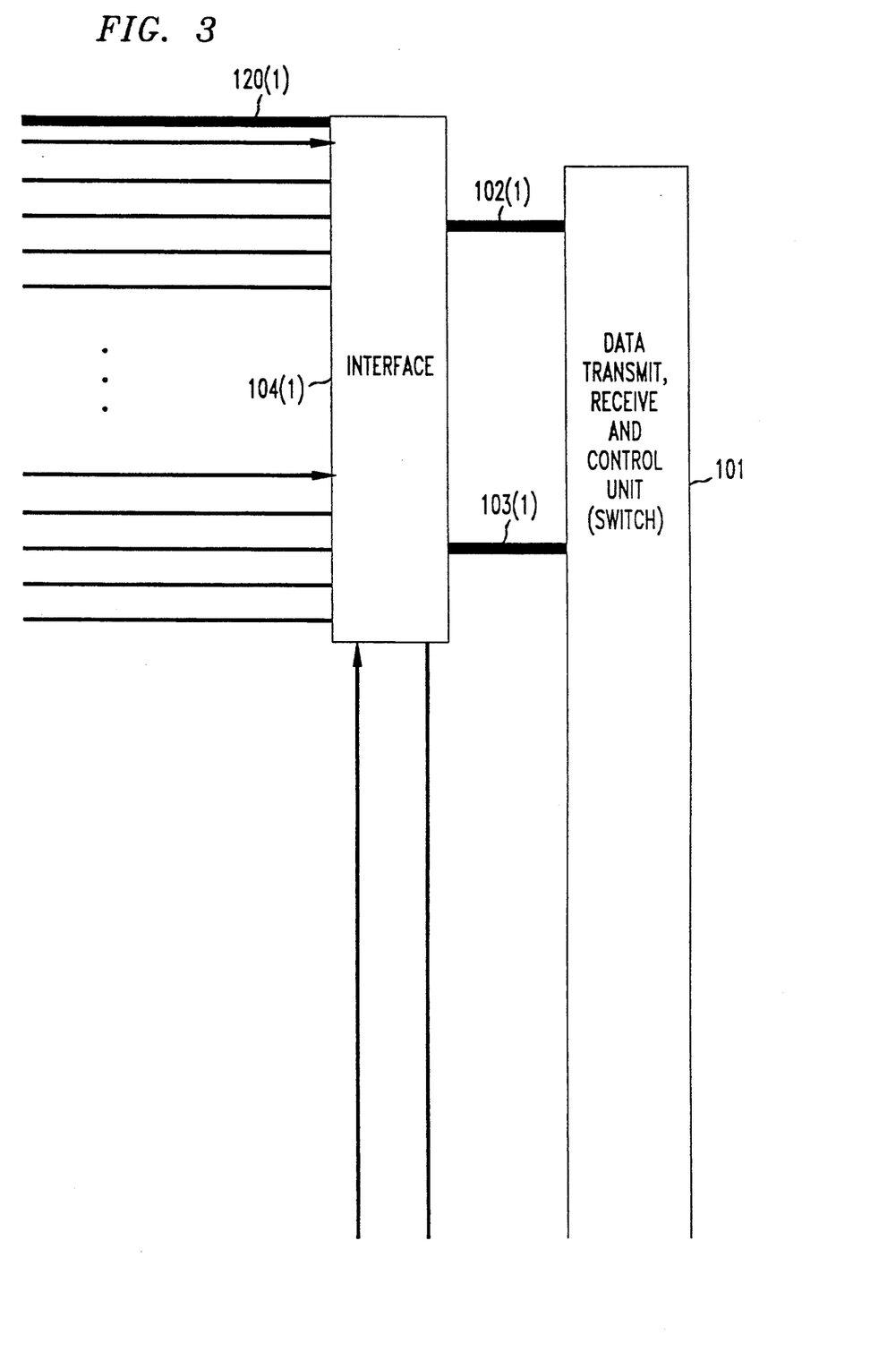
Figure 4:
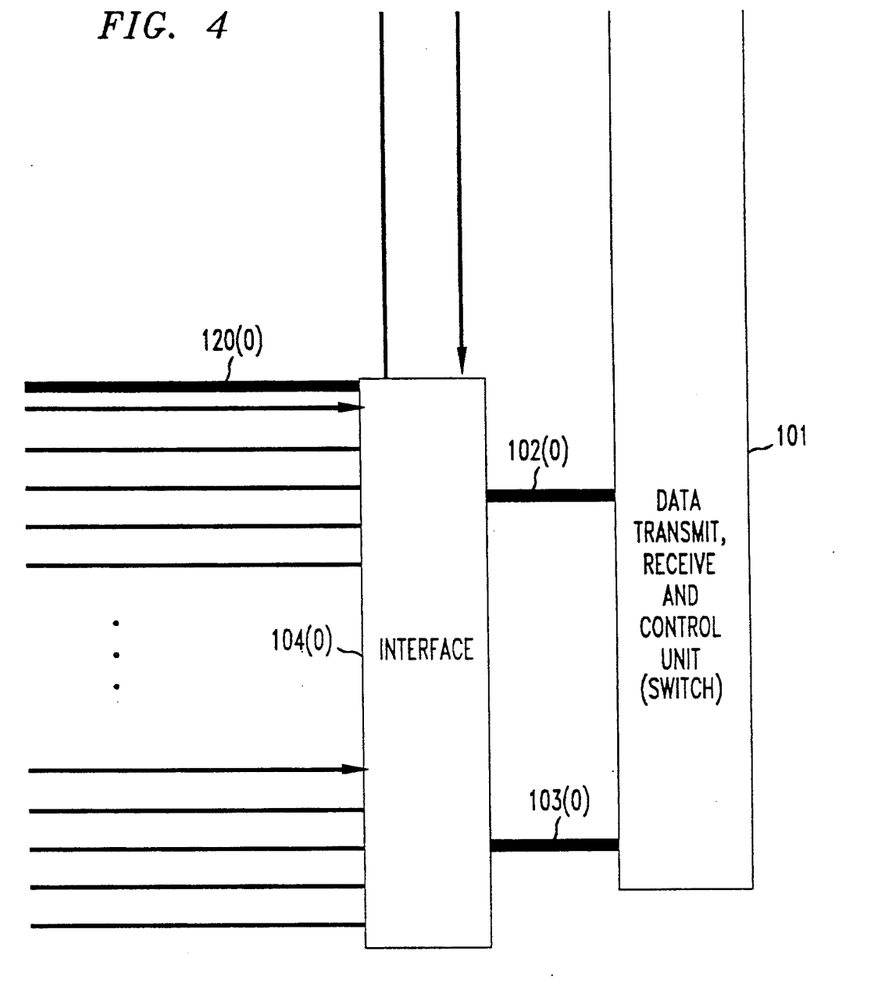
Figure 6:
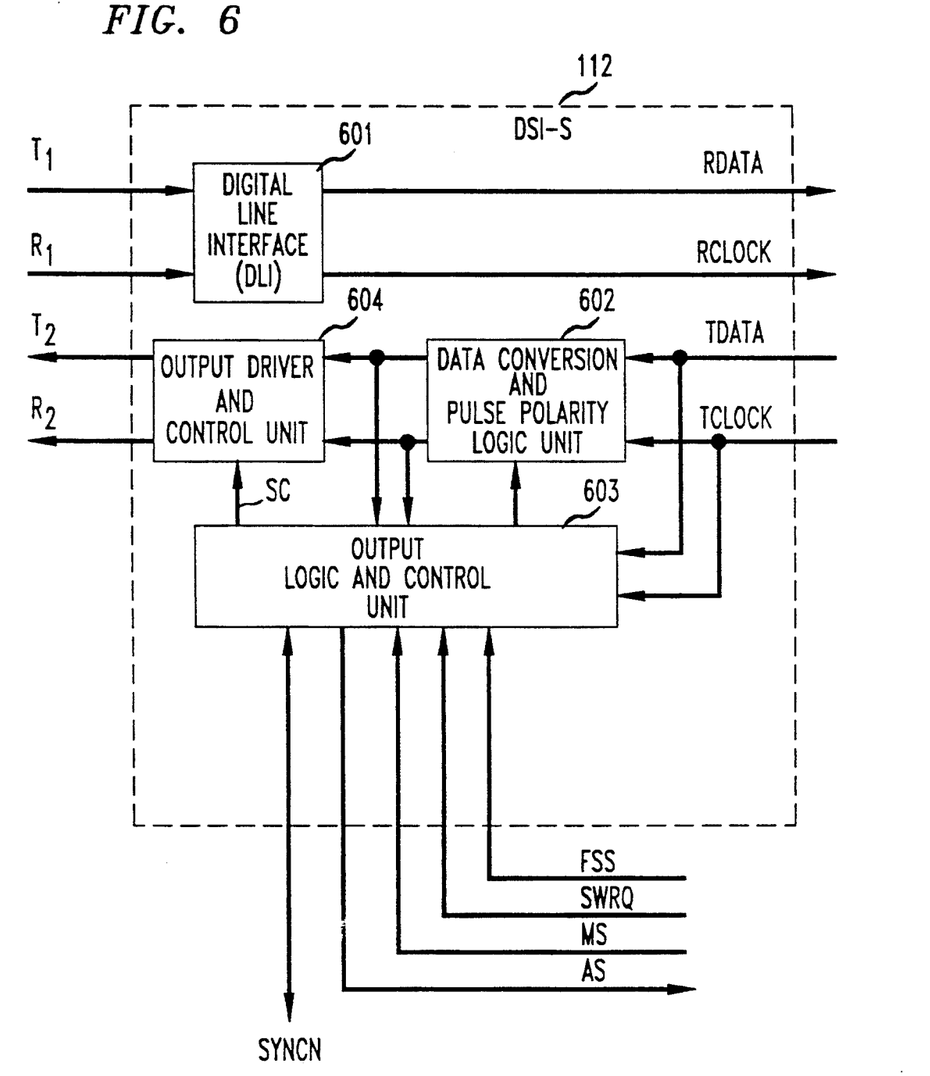
FIG. 6 shows, in simplified block diagram form, details of digital signal interface-switch (DSI-S) units 112.

Details of an illustrative one of DSI-S units 112 are shown in FIG. 6, in simplified block diagram form. Specifically, shown are digital line interface (DLI) 601, data conversion and pulse polarity logic unit 602, output logic and control unit 603 and output driver and control unit 604. A received digital signal is supplied via $T_1$ and $R_1$ to DLI 601. In this example, as noted above and not to be construed as limiting the scope of the invention, a DS1 ESF digital signal is assumed. The DS1 ESF digital signal is well known in the art and is a bipolar signal having three states, namely, +1, 0 and −1. Digital line interface arrangements, such as DLI 601, are also well known in the art and usually include among others a bipolar to unipolar converter for obtaining the unipolar RDATA signal from the received DS1 ESF digital signal and timing recovery circuitry for deriving RCLOCK from the received DS1 ESF digital signal. For the DS1 ESF digital signal RCLOCK has a bit rate of 1.544 Mb/sec. The RDATA unipolar digital signal and RCLOCK signal are supplied to the associated PCM transceiver 111 (FIG. 1).

A TDATA unipolar digital data signal and a corresponding TCLOCK signal—in this example, the unipolar DS1 ESF digital signal and its corresponding clock signal-are supplied from the associated PCM transceiver 111 to data conversion and pulse polarity logic unit 602 and to output logic and control unit 603. Also supplied to output logic and control unit 603 from processor 110 (FIG. 1) are control signals MS, SWRQ and FSS. Output logic and control unit 603 transmits or receives SYNCN as a first control signal depending on whether the corresponding DSI-S unit is in the active state or standby state, respectively. Output logic and control unit 603 also supplies control signal AS to processor 110 and a second control signal SC to output driver and control unit 604. Control signal AS indicates the state of the DSI-S unit, i.e., active or standby and, therefore, whether or not a switch has been successfully completed. Data conversion and pulse polarity logic unit 602 converts the unipolar TDATA digital signal, in this example, to a bipolar DS1 ESF digital signal having +1, 0 and −1 bit states, in well known fashion. Data conversion and pulse polarity logic unit 602 responds to a control signal from output logic and control unit 603 to cause a current bit of the bipolar DS1 ESF digital signal to assume a prescribed state in response to a received SYNCN pulse state. In this example, when a low state, i.e., logical zero (0), SYNCN pulse is received, a bit of the bipolar DS1 ESF digital signal to be supplied as an output resulting from a current input bit of T'DATA from data conversion and pulse polarity logic unit 602 is forced to be in a prescribed condition, in this example, a plus one (+1) state. It is noted that upon receiving the low state SYNCN pulse, the state of the DS1 ESF digital signal bit being supplied as an output from data conversion and pulse polarity logic unit 602 could be either +1 or −1. The bipolar DS1 ESF digital signal output from data conversion and pulse polarity logic unit 602 and TCLOCK are supplied to output driver and control unit 604 which, in turn, supplies the bipolar DS1 ESF digital signal to the transmit data transmission line comprised of $T_2$ and $R_2$. The bipolar DS1 ESF digital signal output from data conversion and pulse polarity logic unit 602 is also supplied to output logic and control unit 603. The output driver circuit in output driver and control unit 604 includes a semiconductor device (not shown) which in response to first and second states of the aforementioned second control signal SC from output logic and control unit 603 is operative to supply the bipolar DS1 ESF digital signal to $T_2$, $R_2$ when in the active state or to present an open circuited output to $T_2$, $R_2$ when in the standby state, respectively. Operation of output logic and control unit 603 in independently determining the instant when to switch the corresponding DSI-S from an active state to a standby state and vice versa is described below in conjunction with the flow charts of FIGS. 7 and 8. The AS control signal from output logic and control unit 603 of the corresponding DSI-S unit 112 is supplied via processor 110 (FIG. 1) to the associated interface unit 104, and in turn to digital switch 101 in order to select the R'DATA(1) signal from the active state DSI-S unit 112, and hence, the active state hardware unit 105. It should be noted that the R'DATA(0) signals from the standby hardware unit 105(0) may not be the same as those from the active hardware unit 105(1) because the tranceivers 111(0) or other units in the standby hardware unit 105(0) may not be enabled to receive and/or de-format the associated incoming signal.

The operation of each DSI-S unit 112 is similar and each DSI-S unit 112, in accordance with an aspect of the invention, independently determines the instant that a switch should be made from the active state to the standby state or vice versa. Upon power up, all of DSI-S unit 112(1) in hardware unit 105(1) and DSI-S units 112(0) in hardware unit 105(0) (FIG. 1) are initially forced to the standby state. Then, all of the DSI-S units 112(1) in hardware unit 105(1) are forced into the active state via an MS=0 control signal pulse from the associated processor 110(1). Thus, in this example, DSI-S units 112(1) are initially in the active state and DSI-S units 112(0) are initially in the standby state.

Figure 7:
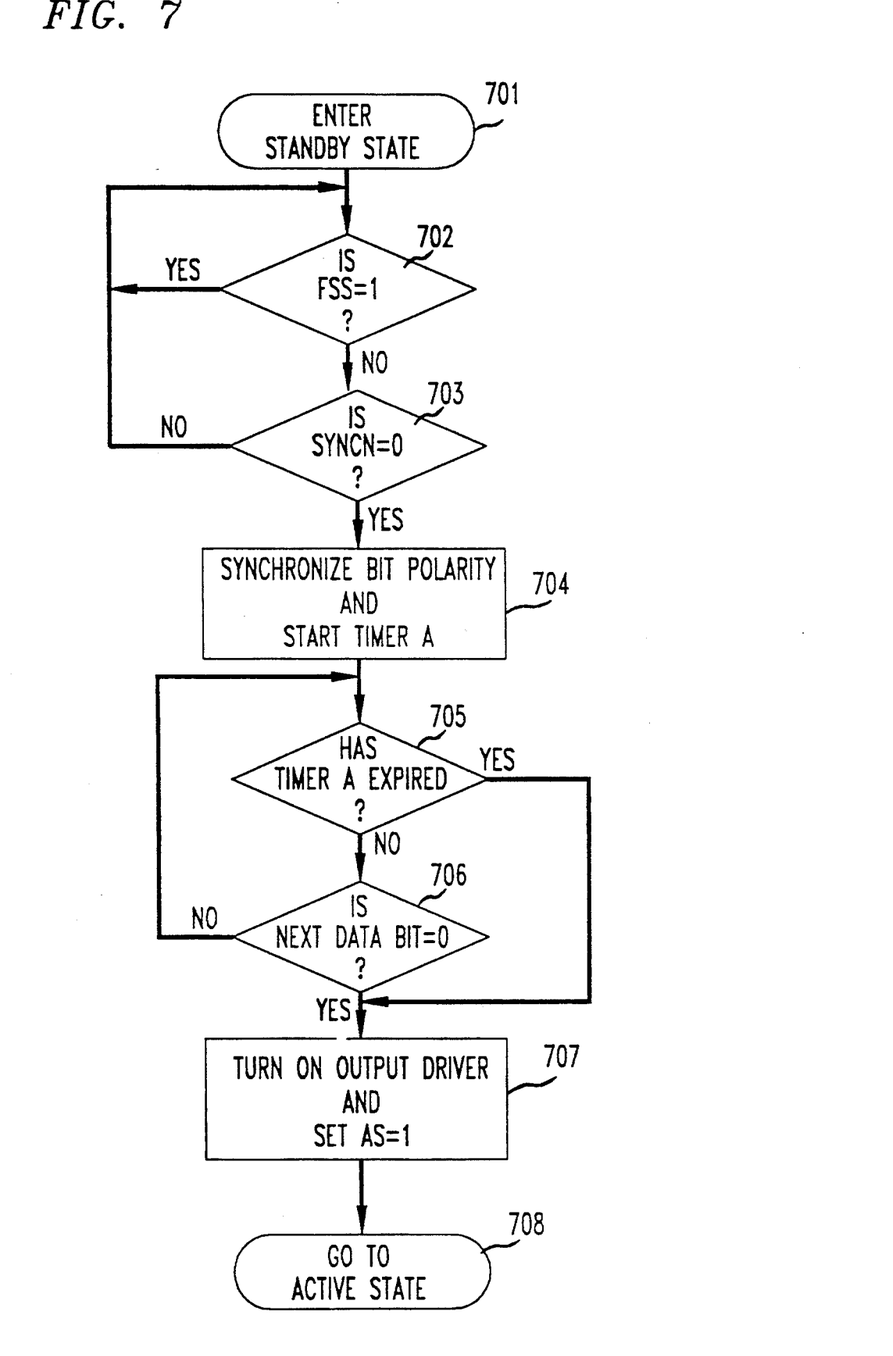
FIG. 7 shows, in flow chart form, details of the operation of DSI-S units 112 when in an active state.

Operation of the DSI-S units in the standby state in switching to the active state is illustrated in the flow chart of FIG. 7. Specifically, the standby state is entered via step 701. Then, conditional branch point 702 tests to determine if FSS=1 from the associated processor 110 (FIG. 1). If the test result is YES, the DSI-S unit is in a forced standby state and remains in that state until FSS=0. A switch to the active state is initiated by the associated DSI-S unit which is in the active state sending a low state SYNCN signal, i.e., SYNCN=0, to the associated standby DSI-S unit. Accordingly, conditional branch point 703 tests to determine if SYNCN=0. If the test result is NO, control is returned to step 702. If the test result in step 703 is YES, a switch has been initiated by the active state DSI-S unit. As indicated above, upon receiving a SYNCN=0, it is known that the polarity of the current outgoing DS1 ESF digital signal bit from the associated DSI-S unit 112(1) is, in this example, plus one (+1) and operational block 704 sychronizes the polarity of the outgoing DS1 ESF digital signal bit to be supplied from the data conversion and pulse polarity logic unit 602 (FIG. 6) resulting from a current input bit of TDATA of the associated DSI-S unit 112(0) to be plus one (+1) and a timer A (not shown) in output logic and control unit 603 (FIG. 6) is started. The time out interval of timer A is such as to insure that a switch is effected within a first predetermined interval A and, thereby, protects against the DS1 ESF digital signal having too many consecutive +1 or −1 bits. Interval A is determined based on a worst case analysis of the DS1 ESF digital signal data pattern. It is important to note that the switch is to be effected on the next TDATA logical 0 input bit after synchronizing to the DS1 ESF digital signal +1 bit to be supplied as an output. The reason for switching on the next DS1 ESF digital signal bit having a logical 0 condition, i.e., state, is that no current is flowing in the output driver circuit at that instant and switching on the logical 0 bit provides the largest margin of tolerance in minimizing "glitches", i.e., "hits", in the data signal. If a switch were effected when the DS1 ESF digital signal bit is either +1 or −1, current would be flowing in the output driver circuit and a possible "glitch", i.e., "hit", in the data signal could occur. Such glitches are undesirable because they could propagate a data bit error and could also propagate as bipolar violations which would cause a downstream alarm condition. Therefore, conditional branch point 705 tests to determine if the timing interval of timer A has expired. If the test result is NO, conditional branch point 706 tests to determine if the current bit of TDATA is in a first predetermined state, namely, a logical 0. If the test result in step 706 is NO, control is returned to step 705. Steps 705 and 706 are iterated until either one yields a YES result. If step 705 yields a YES result prior to step 706, the interval of timer A has expired. Then, operational block 707 causes output logic and control unit 603 (FIG. 6) to supply a first state of the second control signal SC to output driver and control unit 604. This, in turn, causes the output driver circuit to be enabled, i.e., turned ON, to supply the DS1 ESF digital signal as an output to the transmission outputs $T_2$, $R_2$ (FIG. 6). Step 707 also causes the AS control signal to be set to a logical 1. Thereafter, the associated DSI-S unit 112(0) enters the active state via step 708. If step 706 yields a YES result prior to step 705, a TDATA bit=0 has been detected prior to timing out of timer A, and step 707 turns ON the output driver circuit in output driver and control unit 604 of the associated DSI-S unit 112(0) and also sets AS=1. Thereafter, the associated DSI-S unit 112(0) enters the active state via step 708. Control signal AS=1 indicates that a switch has been made and that the associated DSI-S unit 112(0) has entered the active state to the associated processor 110(0). Processor 110(0) passes the AS=1 indication to interface 104(0). In turn, interface 104(0) passes the AS=1 to digital switch 101 which selects the R'DATA(0) signal from the now active DSI-S unit 112(0) in active hardware unit 105(0).

Figure 8:
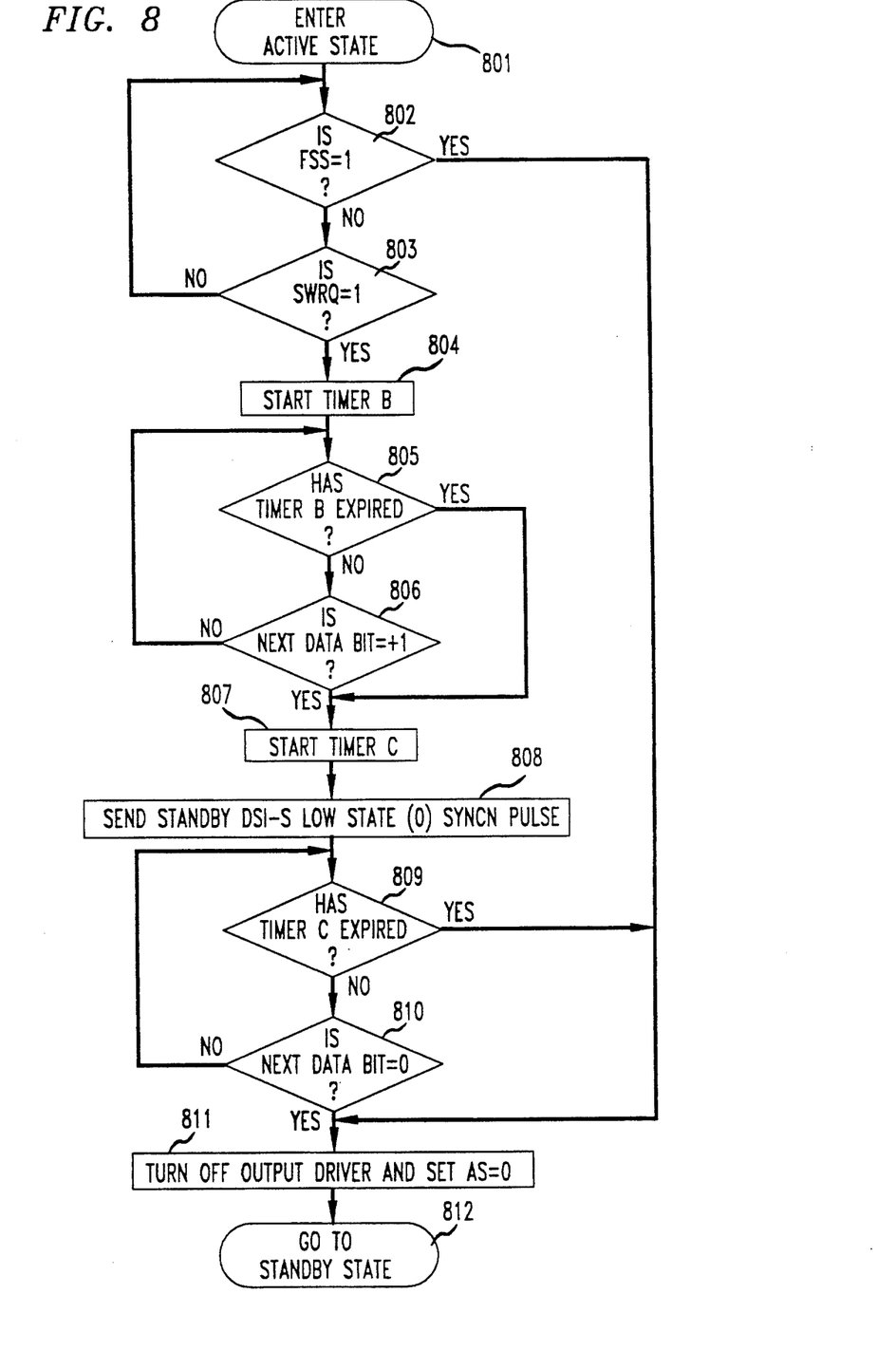
FIG. 8 shows, in flow chart form, details of the operation of DSI-S units 112 when in a standby state.

Operation of the DSI-S units in the active state in switching to the standby state is illustrated in the flow chart of FIG. 8. Specifically, the active state is entered via step 801. Thereafter, conditional branch point 802 tests to determine if FSS=1. If the test result is YES, the corresponding DSI-S unit 112(1) is forced into the standby state. This is effected by operational block 811 causing a second state of the second control signal SC to be supplied from output logic and control unit 603 (FIG. 6) to output driver and control unit 604. This causes the output driver circuit in the DSI-S unit 112(1) to be disabled, i.e., turned OFF. Step 811 also causes the setting of AS=0. Then, the standby state is entered via step 812. AS=0 indicates that the corresponding DSI-S unit 112(1) is in the standby state to the associated processor 110 and, in turn, the associated interface 104 (FIG. 1). If the test result in step 802 is NO, conditional branch point 803 tests to determine if SWRQ=1. As indicated above, SWRQ=1 indicates that a switch has been initiated by digital switch 101 (FIG. 1). If the test result in step 803 is NO, control is returned to step 802. If the test result in step 803 is YES, a switch has been initiated by SWRQ=1 from the associated processor 110 and operational block 804 starts timer B (not shown) in output logic and control unit 603 (FIG. 6).

The time out interval of timer B is a predetermined interval selected to protect against TDATA not having a +1 bit. Again, the interval of timer B is selected based on an analysis of the DS1 ESF digital signal data pattern and, in this example, is the maximum interval for a +1 bit to occur. Conditional branch point 805 tests to determine if timer B has timed out. If the test result is NO, conditional branch point 806 tests to determine if a predetermined bit state has been detected, in this example, a +1 bit. If the test result in step 806 is NO, control is returned to step 805. Steps 805 and 806 are iterated until either one yields a YES result. If step 805 yields a YES result prior to step 806, timer B has timed out and the maximum interval in which a +1 bit should have been detected has expired. Then, control is transferred to operational block 807. If step 806 yields a YES result prior to step 805, a +1 bit has been detected and operational block 807 starts timer C (not shown) in output logic and control unit 603 (FIG. 6). The time out interval of timer C is identical to the interval of timer A and protects against the TDATA digital signal not having a bit=0. Operational block 808 causes a SYNCN=0 to be sent to the associated standby DSI-S unit 112(0) in hardware unit 105(0). Conditional branch point 809 tests to determine if timer C has timed out. If the test result is NO, conditional branch point 810 tests to determine if a TDATA bit=0 has been detected. If the test result in step 810 is NO, control is returned to step 809. Steps 809 and 810 are iterated until either one yields a YES result. If step 809 yields a YES result prior to step 810, timer C has timed out and control is transferred to step 811. If step 810 yields a YES result prior to step 809, a TDATA bit=0 has been detected within the time out interval of timer C and control is transferred to step 811. Again, step 811 causes the output driver circuit of the corresponding DSI-S unit 112(1) to be turned OFF and sets AS=0. The standby state is entered via step 812. Note that intervals A and C being the same also assures that the DSI-S units switch at the same instant in the event that the DS1 ESF digital signal pattern includes too many +1 or −1 bits.

Thus, it is seen that the active switching unit and the standby switching unit individually determine the instant at which to switch from the active state to the standby state and vice versa. The only cooperation between the active and standby units is the transmitting and receiving of the SYNCN pulse. Accordingly, the protection switch of the digital data signal is realized in a hitless manner without the need for a central controller to determine the instant at which the protection switch should be made.

The above-described arrangements are, of course, merely illustrative of the application of the principles of the invention. Other arrangements may be devised by those skilled in the art without departing from the spirit or scope of the invention.

Specifically, in certain applications, it may be desirable to include active and standby units on a single circuit board or to have only an individual active unit and standby unit pair on a single circuit board.

Additionally, although this embodiment of the invention has been described in relation to a DS1 ESF digital signal, it will be apparent to those skilled in the art that the invention may be equally employed to provide hardware protection switching for other digital signals having different signal formats. Moreover, the choice of the bit states on which to effect the switch is within the discretion of the implementor.

We claim:

1. A protection switching unit for use in a hardware protection switching arrangement and being adapted for controllably supplying and receiving a digital signal to and from, respectively, a digital transmission line, the protection switching unit comprising:

means for multiplexing a digital data signal into a prescribed digital signal having a predetermined framing format;

means responsive to a switch request signal for detecting a next bit having a first predetermined bit condition of a digital signal being supplied as an output from the unit, means for generating a first control signal in response to said means for detecting indicating that a bit having said first predetermined bit condition has been detected of said digital signal being supplied as an output D from the unit;

means for supplying said first control signal as an output from the unit;

means responsive to a received first control signal for synchronizing to said first predetermined bit condition of a digital signal to be supplied as an output from the unit to the digital transmission line;

means for generating a second control signal based on a second predetermined bit condition of a digital signal being supplied as an input to the unit; and output circuit means for supplying said digital signal as an output, said output circuit means having an ON state and an OFF state and being responsive to said control signal to select either the ON state or the OFF state.

2. The apparatus as defined in claim 1 wherein said means for synchronizing includes means responsive to said first control signal for causing a bit of said digital signal to be supplied as an output from the unit to assume said first predetermined bit condition.

3. The apparatus as defined in claim 2 wherein said first predetermined bit condition is representative of a predetermined logical state.

4. The apparatus as defined in claim 1 wherein said means for detecting detects said predetermined bit condition representative of a predetermined logical state of said digital signal being supplied as an input to the unit.

5. The apparatus as defined in claim 1 further including means responsive to said first control signal for generating said second control signal upon termination of a predetermined interval prior to detecting a bit having said second predetermined bit condition of said digital signal being supplied as an input to the unit.

6. The apparatus as defined in claim 5 wherein said second control signal has a first state and a second state and wherein said output circuit means is responsive to said first state of said second control signal to select said ON state of said output circuit and to said second state of said second control signal to select said OFF state of said output circuit means.

7. The apparatus as defined in claim 1 wherein said means for generating said first control signal includes means responsive to said switch initiation signal for generating said first control signal upon termination of a predetermined interval prior to detecting said first predetermined bit condition of said digital signal being supplied as an output from the unit.

8. The apparatus as defined in claim 7 wherein said first predetermined bit condition of said digital signal being supplied as an output is representative of a predetermined logical state.

9. The apparatus as defined in claim 8 wherein said means for multiplexing comprises a pulse code modulation (PCM) transceiver.

10. A hardware protection switching arrangement including at least first and second apparatus each adapted for controllably supplying and receiving a digital signal to and from, respectively, a digital transmission line, each of the first and second apparatus comprising:

means for multiplexing a digital data signal into a prescribed digital signal having a predetermined framing format;

means responsive to a switch initiation signal for detecting an occurrence of a first predetermined bit condition of a digital signal being supplied as an output from the apparatus and means for generating a first control signal representative of said first predetermined bit condition upon detection of said occurrence, said first control signal being supplied as an output from the apparatus;

means responsive to a received first control signal for synchronizing to said first predetermined bit condition of a digital signal to be supplied as an output from the apparatus to the digital transmission line;

means for detecting a second predetermined bit condition of a digital signal being supplied as an input to the apparatus and for generating a second control signal upon detecting said second predetermined bit condition of said formatted digital signal being supplied as an input to the apparatus; and output circuit means for supplying said digital signal as an output, said output circuit means having an ON state and an OFF state and being responsive to said second control signal to select either the ON state or the OFF state.

11. The hardware protection switching arrangement of claim 10 wherein said means for multiplexing comprises a pulse code modulation (PCM) transceiver.

12. The hardware protection switching arrangement of claim 10 further including means for coupling digital signals to and from said digital transmission line from and to said at least first and second apparatus.

13. The hardware protection switching arrangement of claim 12 wherein the digital signal being coupled to and from the digital transmission line is a DS1 digital signal.

14. The hardware protection switch arrangement of claim 10 further including control means for generating control signals to initiate a hardware protection switch from one of said at least first and second apparatus to the other one of said at least first and second apparatus.

15. The hardware protection switching arrangement of claim 14 wherein each of said at least first and second apparatus includes means for de- multiplexing an incoming digital signal in said predetermined framing format to obtain a digital data signal and means for generating a switch indication control signal indicative of whether a hardware protection switch was successfully made, and wherein said control means includes means responsive to said switch indication control signal to select the incoming digital data signal from the active one of said at least first and second apparatus.

16. A method for hardware protection switching of apparatus which is adapted to supply and receive a digital signal to and from, respectively, a digital transmission line, comprising the steps of:

multiplexing a digital data signal into a prescribed digital signal having a predetermined framing format;

in response to a switch initiation signal detecting a next bit having a first predetermined bit condition of a digital signal being supplied as an output from the unit;

generating a first control signal indicative that said first predetermined bit condition has been detected;

supplying said first control signal as an output from the apparatus;

in response to a received first control signal, synchronizing to said first predetermined bit condition of a digital signal to be supplied as an output from the apparatus;

detecting a second predetermined bit condition of a digital signal being supplied as an input to the apparatus;

generating a second control signal based indicative that said second bit condition has been detected; and in response to said second control signal, enabling or disabling supplying said digital signal as an output from the apparatus.

* * * * *